United States Patent
Kazdaghli (10) Patent No.: US 10,896,312 B2
(45) Date of Patent: Jan. 19, 2021

(54) METHOD FOR PROCESSING IMAGES OF FINGERPRINTS

(71) Applicant: IDEMIA IDENTITY & SECURITY FRANCE, Courbevoie (FR)

(72) Inventor: Laurent Kazdaghli, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 47 days.

(21) Appl. No.: 16/527,957

(22) Filed: Jul. 31, 2019

(65) Prior Publication Data
US 2020/0050827 A1 Feb. 13, 2020

(30) Foreign Application Priority Data
Aug. 10, 2018 (FR) .................................. 18 57447

(51) Int. Cl.
*G06K 9/00* (2006.01)
*G06T 7/11* (2017.01)
*G06T 5/30* (2006.01)

(52) U.S. Cl.
CPC ....... *G06K 9/00067* (2013.01); *G06K 9/0002* (2013.01); *G06T 5/30* (2013.01); *G06T 7/11* (2017.01)

(58) Field of Classification Search
CPC ........... G06K 9/00013; G06K 9/00087; G06K 9/0004; G06F 21/32
See application file for complete search history.

(56) References Cited

FOREIGN PATENT DOCUMENTS
EP 3214601 A1 9/2017

OTHER PUBLICATIONS

May 2, 2019 Search Report issued in French Patent Application No. 1857447.
Xu et al; "Two Applications of Shape-Based Morphology: Blood Vessels Segmentation and a Generalization of Constrained Connectivity;" EPITA Research and Development Laboratory (LRDE); pp. 390-401; 2013.
Chang et al "Adaptive Image Region Growing;" IEEE Transactions on Image Processing; pp. 868-872; vol. 3; No. 6; Nov. 1994.

*Primary Examiner* — Yuzhen Shen
(74) *Attorney, Agent, or Firm* — Oliff PLC; R. Brian Drozd (57) ABSTRACT

A method for processing an image representing at least one finger supplied by an image sensor of the thin-film transistor type of a fingerprint-capture system is disclosed. The purpose of the method is to modify characteristics of the image so that they correspond to the characteristics of images acquired by a fingerprint-capture system using a CCD or CMOS sensor while preserving relevant information about the image.

8 Claims, 5 Drawing Sheets

METHOD FOR PROCESSING IMAGES OF FINGERPRINTS

The invention relates to a method for processing an image representing a plurality of fingers supplied by an image sensor of the thin-film transistor type of a fingerprint capture system and a device implementing the method.

CONTEXT OF THE INVENTION

The use of fingerprints, for example of the type consisting of the print of one finger or a plurality of fingers, or of the palm of the hand, makes it possible to protect access to buildings or machines. Using this technology reinforces security since the probability of two persons having two identical fingerprints is almost zero.

A system for capturing a fingerprint makes it possible to capture an image of a fingerprint. In the case of identification, this print is compared with a set of reference fingerprints contained in a database. In the case of authentication, this print is compared with a single fingerprint. The comparison makes it possible to determine whether or not the fingerprint captured belongs to a person referenced in the database or whether the person is indeed the one that he claims to be.

Many fingerprint capture systems use CCD (charge-coupled device) image sensors or CMOS (complementary metal-oxide-semiconductor) image sensors. CCD and CMOS sensors provide images having particular properties (distributions of grey levels or of colour component values, resolution, absence of artefacts, etc.) that image processing, recognition and compression algorithms take into account during their processing operations. These processing operations would to a major extent be unsuitable if they had to process images having different properties. For example, these algorithms would be incapable of processing images supplied by sensors using a different technology such as TFT (thin-film transistor) sensors. For example, when a finger is placed on a fingerprint capture system using a TFT sensor, referred to as a TFT system, the finger appears in the image supplied by the sensor with grey levels that are reversed compared with an image supplied by a fingerprint capture system using a CCD or CMOS sensor, referred to as a CCD/CMOS system. Moreover, in the finger images supplied by a TFT system, projected shadows appear in the vicinity of the finger, which is not the case with a CCD/CMOS system.

It is desirable to overcome these drawbacks of the prior art. It is in particular desirable to propose a method and device that make it possible to use TFT sensors with algorithms intended to receive images coming from CCD or CMOS sensors. Moreover, this method must be simple to implement.

DISCLOSURE OF THE INVENTION

According to a first aspect of the invention, the invention relates to a method for processing an image representing at least one finger supplied by an image sensor of the thin-film transistor type of a fingerprint capture system, said system comprising a transparent plate comprising a face on which each finger is placed and said image sensor is positioned so as to generate an image of each finger. The method comprises: obtaining an image of each finger supplied by the image sensor, referred to as the first image; obtaining a second image by eliminating each continuous component of the first image; obtaining a third image by applying an averaging filter to the second image; applying a connected component analysis to the third image in order to define regions in said third image, each region comprising pixels having an identical value, referred to as the representative value; organising the regions in the form of a hierarchical tree in which the regions are organised in accordance with a parent-child relationship, a first region being the parent of a second region, which is then the child of the first region, when at least one pixel of the second region is adjacent to a pixel of the first region and a difference between the values representing the first and second regions is smaller than a difference between the values representing the first region and all other regions having at least one pixel adjacent to a pixel of the first region, the child region having a representative value smaller than its parent region; running through the hierarchical tree by order of increasing representative values and agglomerating each child region with its parent region when a predetermined criterion is met; determining a convex envelope for each agglomerated region obtained; generating a fourth image while keeping the pixels situated in each convex envelope in the second image.

The image obtained by applying the method of the invention to an image issuing from a sensor of the thin-film transistor type then has properties in accordance with the properties of images supplied by a CCD or CMOS sensor. The characteristics of the images obtained by this method are then in conformity with characteristics of images expected by image processing methods suited to images issuing from CCD or CMOS sensors. Moreover, the organisation in a hierarchical tree and running through this hierarchical tree when regions are formed makes it possible to determine a plurality of regions in parallel and thus to process images representing a plurality of fingers.

According to one embodiment, the method comprises applying a morphological erosion to the agglomerated regions and applying at least one morphological dilation to the regions obtained by morphological erosion as long as each region obtained by morphological erosion remains independent, the determination of each convex envelope taking place on each agglomerated region after morphological erosion and dilation.

The erosion and then the dilation make it possible to segment regions comprising a plurality of fingerprints into a plurality of regions each comprising one fingerprint.

According to one embodiment, the method comprises applying a processing to the values of the pixels of the fourth image included in each convex envelope so that these pixels have values situated in a predetermined range of values.

According to one embodiment, a predetermined criterion is based on a change in areas of regions resulting from the agglomeration and/or on a comparison of a gradient value representing the parent region to be agglomerated with at least one child region with a predetermined gradient threshold.

According to one embodiment, the predetermined criterion based on a change in the areas of regions resulting from the agglomeration consists of comparing a coefficient of increase with a first predetermined threshold, a child region being able to be agglomerated with its parent region when the coefficient of increase is less than said first predetermined threshold, the coefficient of increase being calculated as follows:

$$C = a \times S + b \times \Delta S$$

where C is the coefficient of increase, a and b are predetermined constants, S is an area of the child region and $\Delta S$ is a percentage increase of the area of the agglomerated region with respect to the area of the child region.

According to one embodiment, in the predetermined criterion based on a comparison of a gradient value representing the parent region to be agglomerated with at least one child region with a predetermined gradient threshold, the gradient representing the parent region is calculated between the value representing the parent region and the lowest value representing a region of the third image, an agglomeration being accepted when said gradient is higher than the predetermined gradient threshold.

According to a second aspect of the invention, the invention relates to a device for processing an image representing at least one finger supplied by an image sensor of the thin film transistor type of a fingerprint capture system, said system comprising a transparent plate comprising a face on which each finger is placed and said image sensor is positioned so as to generate an image of each finger. The device comprises: obtaining means for obtaining an image of each finger supplied by the image sensor, referred to as the first image; filtering means for obtaining a second image by eliminating each continuous component of the first image; filtering means for obtaining a third image by applying an averaging filter to the second image; processing means for applying a connected component analysis to the third image in order to define regions in said third image, each region comprising pixels having an identical value, referred to as the representative value; processing means for organising the regions in the form of a hierarchical tree in which the regions are organised in a parent-child relationship, a first region being the parent of a second region, which is then the child of the first region, when at least one pixel of the second region is adjacent to a pixel of the first region and a difference between the values representing the first and second regions is smaller than a difference between the values representing the first region and all other regions having at least one pixel adjacent to a pixel of the first region, the child region having a lower representative value than its parent region; processing means for running through the hierarchical tree by order of increasing representative value and agglomerating each child region with its parent region when a predetermined criterion is met; processing means for determining a convex envelope for each region obtained by dilation; processing means for generating a fourth image while keeping the pixels situated in each convex envelope in the second image.

According to a third aspect of the invention, the invention relates to a computer program comprising instructions for the implementation, by a device, of the method according to the first aspect, when said program is executed by a processor of said device.

According to a fourth aspect of the invention, the invention relates to storage means, storing a computer program comprising instructions for the implementation, by a device, of the method according to the first aspect, when said program is executed by a processor of said device.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION OF VARIOUS EMBODIMENTS

The method of the invention is described in a context where a fingerprint capture system using a sensor of the thin film transistor type makes acquisitions of images of a plurality of fingers. The invention is however suitable for functioning on images comprising only one finger. It then makes it possible to obtain images of a finger having properties identical to the properties of images acquired by a fingerprint capture system using a CCD or CMOS sensor.

Figure 1:
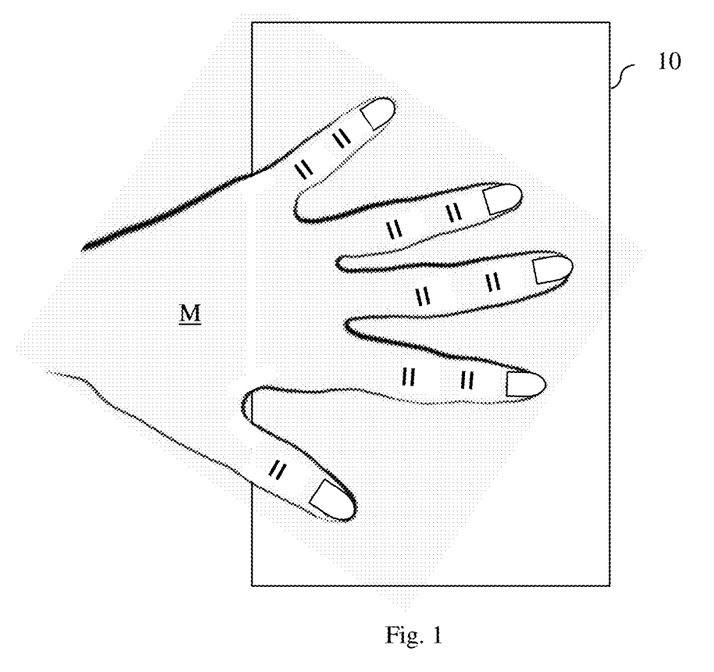
FIG. 1 describes schematically an example of a fingerprint capture system using the method according to the invention.

FIG. 1 describes schematically an example of a fingerprint capture system using the method according to the invention.

In FIG. 1, a plurality of fingers on a hand M are placed on a print capture system 10.

Figure 2:
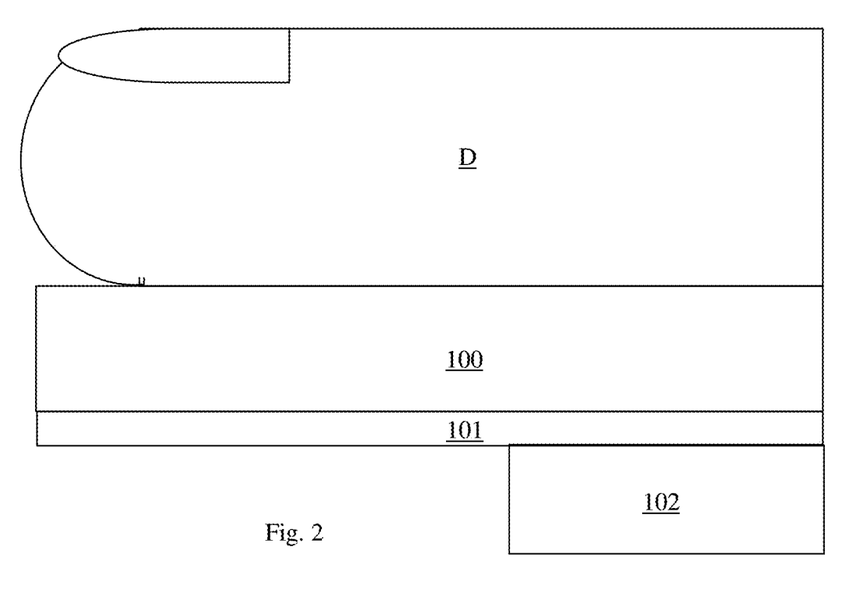
FIG. 2 illustrates schematically in detail the fingerprint capture system.

FIG. 2 illustrates schematically in detail the fingerprint capture system 10.

The fingerprint capture system 10 comprises a transparent plate 100 comprising a top face on which the plurality of fingers are placed, only one finger D of which is depicted in FIG. 2. Situated below the transparent plate 100 and bonded to the bottom face of said plate, the fingerprint capture system comprises an image sensor of the thin film transistor type, referred to as a TFT sensor 101. The TFT sensor 101 is positioned so as to generate an image of the plurality of fingers. The fingerprint capture system 10 also comprises a processing module 102.

Figure 3:
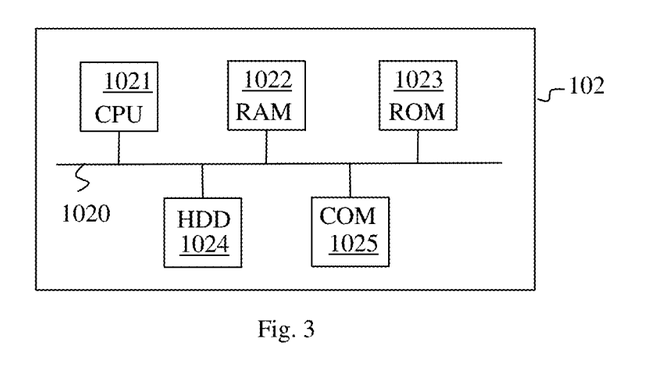
FIG. 3 illustrates schematically an example of hardware architecture of a processing module implementing the method according to the invention.

FIG. 3 illustrates schematically an example of hardware architecture of the processing module 102.

According to the example of hardware architecture shown in FIG. 3, the processing module 102 then comprises, connected by a communication bus 1020: a processor or CPU (central processing unit) 1021; a random access memory RAM 1022; a read only memory ROM 1023; a storage unit such as a hard disk or a storage medium reader, such as an SD (secure digital) card reader 1024; at least one communication interface 1025 enabling the processing module 102 to receive the images acquired by the image sensor 101.

The processor 1021 is capable of executing instructions loaded into the RAM 1022 from the ROM 1023, from an external memory (not shown), from a storage medium (such as an SD card), or from a communication network. When the processing module 102 is powered up, the processor 1021 is capable of reading instructions from the RAM 1022 and executing them. These instructions form a computer program causing the implementation, by the processor 1021, of the method described in relation to FIG. 4.

Figure 4:
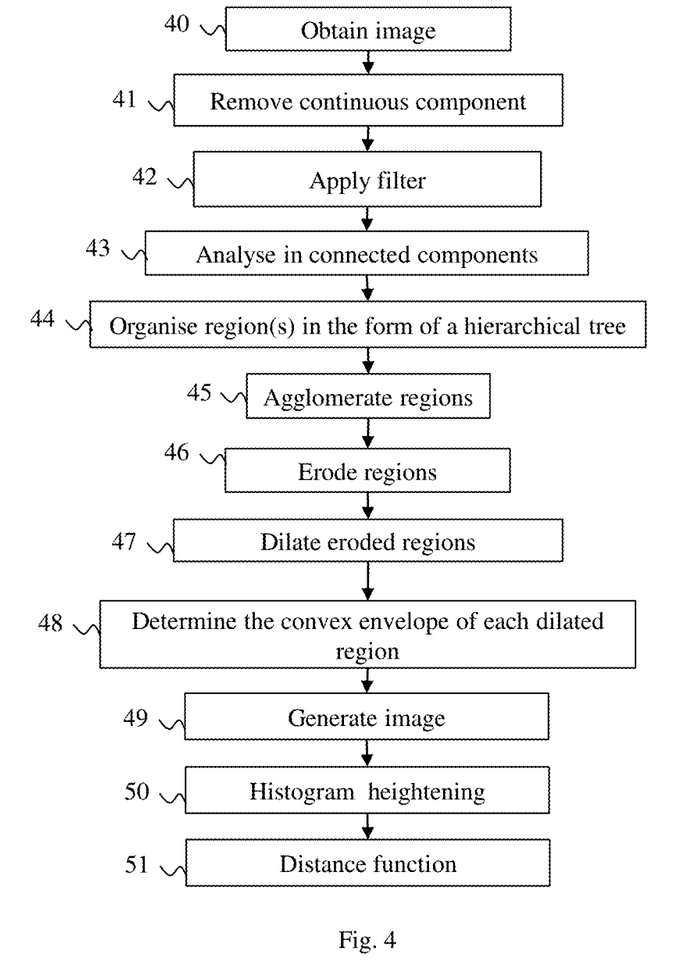
FIG. 4 illustrates schematically an example of a method for processing an image representing at least one finger supplied by an image sensor of the thin film transistor type.

The method described in relation to FIG. 4 can be implemented in software form by the execution of the set of instructions by a programmable machine, for example a DSP (digital signal processor), a microcontroller or a GPU (graphics processing unit), or be implemented in hardware form by a machine or a dedicated component, for example an FPGA (field-programmable gate array) or an ASIC (application-specific integrated circuit).

FIG. 4 illustrates schematically an example of a method for processing an image representing at least one finger supplied by an image sensor of the thin film transistor type.

Figure 5A:
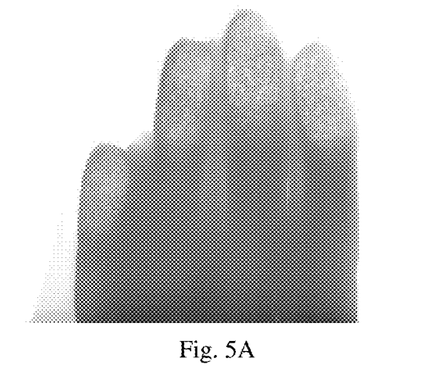
FIG. 5A shows an image of a plurality of fingers supplied by an image sensor of the thin film transistor type.
Figure 5B:
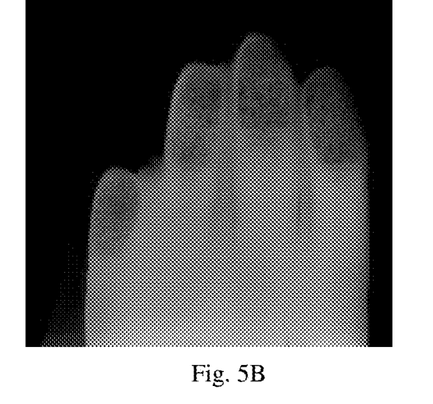
FIG. 5B shows the image of a plurality of fingers supplied by the image sensor of the thin film transistor type after reversal of the grey levels.

In a step 40, the processing module 102 obtains a first image from the TFT sensor 101. An example of an image of a plurality of fingers supplied by the TFT sensor 101 is shown by FIG. 5A. The parts of the plurality of fingers in contact with the top face of the transparent plate 100 appear in dark grey. The valleys of the fingerprints of the plurality of fingers appear in light grey, or even in white. Projected shadows appear in the vicinity of the fingers. FIG. 5B shows the image of FIG. 5A after reversal of the grey levels. It will be realised that a simple reversal of the grey levels does not make it possible to obtain a usable image. This is because the projected shadows are still present and merely change the grey level. The presence of projected shadows prevents the correct identification of each finger and may create false minute details of fingerprints.

Figure 6A:
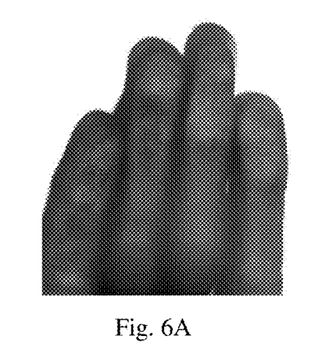
FIG. 6A shows an image of a plurality of fingers supplied by an image sensor of the thin film transistor type used as an input of a top-hat filter.
Figure 6B:
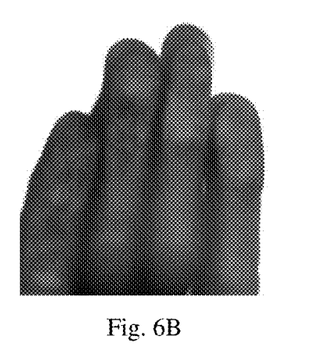
FIG. 6B shows the image of a plurality of fingers supplied by the image sensor of the thin-film transistor type that has undergone a morphological closing.
Figure 6C:
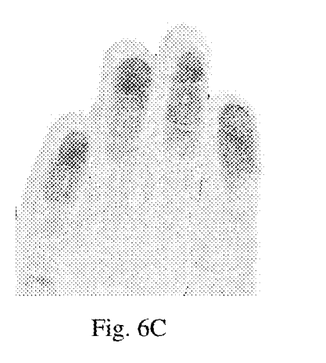
FIG. 6C shows an image resulting from a top-hat filter.

In a step 41, the processing module 102 eliminates each continuous component of the first image in order to obtain a second image. A continuous component in an image appears in the form of a uniform zone. In one embodiment, the processing module 102 applies a high-pass filter to the first image in order to obtain the second image. In one embodiment, the second image is obtained by the processing module 102 by applying a top-hat filter as described in the document "P. T Jackway, improved morphological top-hat», Electronics Letters, Vol: 36, Issue: 14, 6 Jul. 2000)" to the first image in order to eliminate each continuous component. Applying a top-hat filter to an initial image consists of applying a morphological closing to said initial image and then calculating a difference between the initial image and the image resulting from the morphological closing. FIG. 6A shows an image of a plurality of fingers supplied by a TFT sensor, referred to as the original image, used as an input to a top-hat filter. FIG. 6B shows a result of applying a morphological closing to the original image. FIG. 6C shows a result of applying a top-hat filter to the original image. In the second image, the pixels corresponding to the ridges of the fingerprints appear in dark grey whereas the pixels corresponding to the valleys appear in light grey, which corresponds to characteristics required for the images. However, these interesting pixels are buried among pixels offering little interest, or even no interest, for recognition of fingerprints. The remainder of the method makes it possible to eliminate pixels without interest for the recognition of fingerprints.

Figure 7:
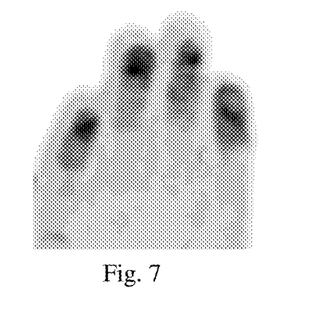
FIG. 7 shows the image resulting from the top-hat filter after application of an averaging filter.

In a step 42, the processing module 102 obtains a third image by applying an averaging filter to the second image. An averaging filter replaces each pixel to be filtered with an average calculated from the value of said pixel and the values of pixels adjoining said pixel. FIG. 7 represents an image corresponding to an application of an averaging filter to the image in FIG. 6C (i.e. to the second image).

In a step 43, the processing module 102 applies a connected component analysis to the third image in order to define regions of said third image, each region consisting of pixels having an identical value, hereinafter referred to as the representative value. A connected component analysis applied to an image consists of running through the pixels of said image and giving a label to each pixel. Two adjacent pixels which have the same value are considered to belong to the same region and therefore have the same label. Two adjacent pixels that do not have the same value do not belong to the same region and therefore have different labels.

In a step 44, the processing module 102 organises the regions obtained in the form of a hierarchical tree in which the regions are organised in a parent-child relationship. In this tree, a first region is the parent of a second region, which is then the child of the first region, when at least one pixel of the second region is adjacent to a pixel of the first region and a difference between the values representing the first and second regions is smaller than a difference between the values representing the first region and all other regions having at least one pixel adjacent to a pixel in the first region. In the second image, the pixels corresponding to the zones of the plurality of fingers most pressed on the top face of the transparent plate, that is to say corresponding in particular to the ridges of the fingerprints, are the darkest pixels. In terms of grey level, a dark pixel corresponds to a low grey level value (i.e. close to zero), whereas a light pixel corresponds to a high grey level value (i.e. close to 255, for grey levels coded in 8 bits). In the hierarchical tree, a child region has a representative value (that is to say the common value of each pixel constituting this region) lower than its parent region. The hierarchical tree therefore comprises leaves (i.e. regions without children) corresponding to the darkest regions. The organisation of the regions in the form of a hierarchical tree relies for example on a method described in the document "Yongchao Xu, *Tree-based shape spaces: definition and applications in image processing and computer vision*, Université Paris-Est, 2013".

Figure 13A:
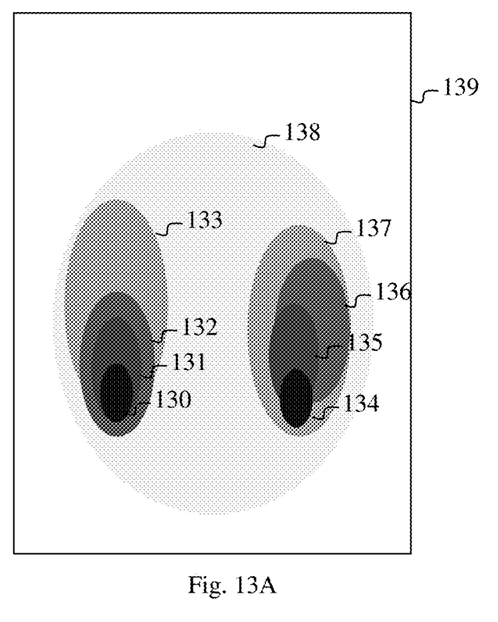
FIG. 13A is an image comprising a set of regions obtained by connected component analysis of a grey-level image.

FIG. 13A is an image comprising a set of regions obtained by connected component analysis of a grey-level image. The grey level of each region in FIG. 13A corresponds to the representative value of said region. The regions 130 and 134 are the darkest regions and are therefore associated with the lowest representative value. The region 139 that corresponds to the background of the image in FIG. 13A is the lightest region and is therefore associated with the highest representative value.

Figure 13B:
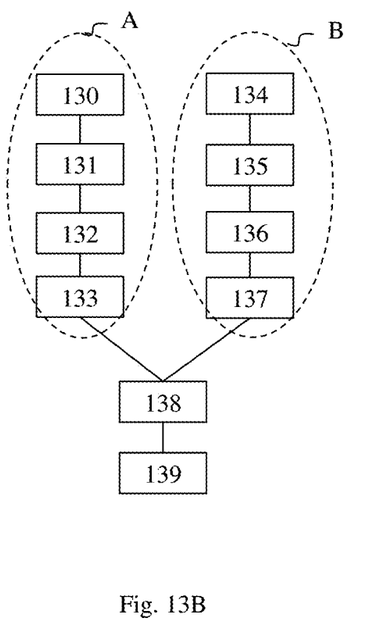
FIG. 13B corresponds to a representation in hierarchical tree form of the image in FIG. 13A.

FIG. 13B corresponds to a representation in hierarchical tree form of the image in FIG. 13A. The leaves of the tree consist of the regions 130 and 134. The root of the tree consists of the region 139. The leaf 130, the nodes 131 to 133 and 138 and the root 139 are organised by order of increasing representative values. The leaf 134, the nodes 135 to 137 and 138 and the root 139 are organised by order of increasing representative values. The hierarchical tree obtained comprises a branch A and a branch B.

It should be noted that, when an intersection between a child region and the parent region is not empty, the intersection is considered to form part of the child region, but does not form part of the parent region. Thus, the region 130, which is totally included in the region 131, does not form part of the region 131. Agglomerating a child region with a parent region consists of determining an agglomerated region corresponding to a union of the parent and child regions.

In a step 46, the processing module 102 runs through the hierarchical tree in order of increasing representative values and agglomerates a child region with its parent region when at least one predetermined criterion is met. A first predetermined criterion is based on a change in an area of the regions resulting from the agglomeration. This criterion is based on the hypothesis that, when, following the agglomeration of a child region with its parent region, the area of the agglomerated region is very greatly increased compared with the area of the child region, and then the agglomerated region encompasses a plurality of fingers.

In one embodiment, the processing module 102 calculates a percentage increase p in the area of the agglomerated region compared with the area of the child region and compares this percentage increase p with a predetermined percentage increase P. A parent region is not agglomerated with a child region if the percentage increase p is greater than the predetermined percentage increase P.

In one embodiment, the processing module 102 calculates a coefficient of increase C:

$$C = a \times S + b \times \Delta S$$

where a and b are two predetermined constants (for example a=1 and b=2), S is the area of the child region to be agglomerated and $\Delta S$ is a percentage increase in the area of the agglomerated region compared with the area of the child region.

An agglomeration of a child region with its parent region is enabled when the coefficient of increase C is less than or equal to a predetermined threshold CMAX. If the coefficient of increase C is greater than the predetermined threshold CMAX, the agglomeration is not enabled and the child region is considered to be a final region. The predetermined threshold CMAX is for example equal to 150. In the example in FIG. 13A, the child region 130 may be agglomerated with its parent region 131 since the coefficient of increase C is lower than the predetermined threshold CMAX for this agglomeration. The region resulting from this agglomeration then becomes the child of the region 132. For the same reason, the agglomeration with the regions 132 and then 133 is enabled. On the other hand, the coefficient of increase C being higher than the predetermined threshold CMAX for the agglomeration with the region 138, this agglomeration is not enabled. The agglomeration for the branch A of the hierarchical tree stops and the region resulting from the agglomerations of the regions 130 to 133 becomes final. Likewise, the final region for the branch B results from the agglomerations of the regions 134 to 137.

A second predetermined criterion is based on a comparison of a gradient g representing the parent region to be agglomerated with at least one child region with a predetermined gradient threshold G. Thus, a parent region is agglomerated with a child region if the gradient g between the representative value of this parent region with the smallest representative region value of the third image is higher than the predetermined gradient threshold G. The predetermined gradient threshold is for example equal to 5. In the example in FIG. 13A, the region 138 would not have been able to be agglomerated with the region resulting from the agglomerations of the regions 130 to 133 since the gradient g between the region 138 and the region 139 is lower than the predetermined gradient threshold G. Agglomerating according to the gradient makes it possible not to take into account regions with a very small gradient that would be generated by latents left by previous applications of fingers on the top face of the transparent plate 100.

It should be noted that the processing module 102 uses the first and/or second criterion.

Figure 8:
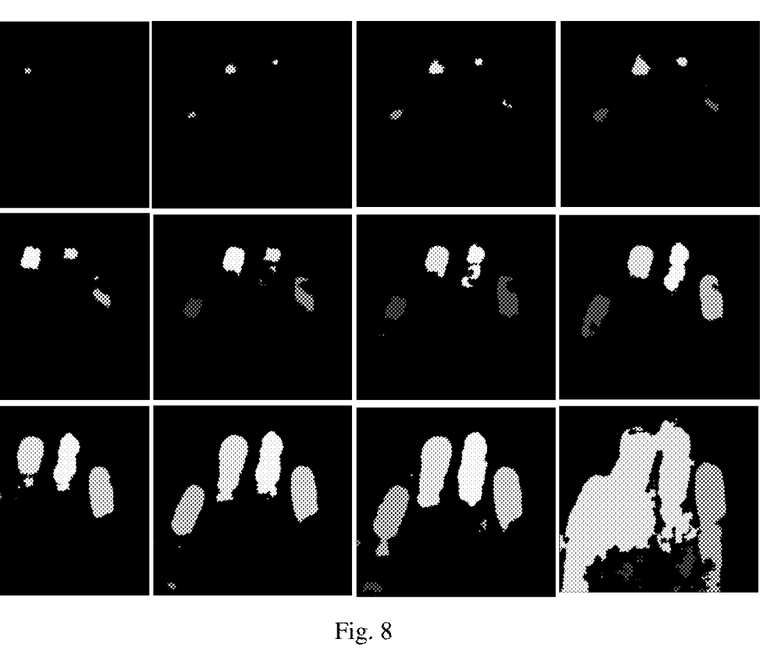
FIG. 8 shows a succession of images illustrating a method for forming regions in the image resulting from the averaging filter using a hierarchical tree.

FIG. 8 shows a succession of images illustrating a formation of regions in the third image using the hierarchical tree.

For more visibility, in the images in FIG. 8 (but also for the images in FIGS. 9, 10A, 11B, 12A and 12C) the representative values of the regions have been reversed. Thus, the lightest regions in the images in FIG. 8 correspond to the darkest zones in the third image and the darkest regions correspond to the lightest zones in the third image. The background of the images in FIG. 8 therefore appears black.

The images in FIG. 8 read from left to right and from top to bottom. A first region appears in the first image in the succession. This region corresponds to the darkest zone in the third image. Two other regions appear in the second image in the succession, and then a fourth in the third image in the succession. These four regions correspond to the four fingers placed on the top face of the transparent plate 100. Each region corresponds to the darkest zone of a finger. Since the darkest zones in the third image (and therefore the lightest regions in the images in FIG. 8) correspond to the parts of fingers most pressed on the top face of the transparent plate 100, it will be realised that some fingers are more pressed than others on said top face.

The images in FIG. 8 show that running through the hierarchical tree and agglomerating the child regions with their child region makes it possible, as the agglomerations occur, to obtain regions corresponding to the fingers. In the last image in the succession, three fingers are agglomerated in the same region situated to the left of the last image. This region is to be excluded since it does not meet the predetermined criterion and in particular the first criterion. The processing module 102 then considers that the regions in the penultimate image in the succession agglomerated to form the region to be excluded are final regions.

It should be noted that the organisation in a hierarchical tree makes it possible to run through the branches of the hierarchical tree independently. A plurality of regions can thus enlarge in parallel and independently. A region may continue to enlarge whereas another region is at the final-region stage.

Figure 9:
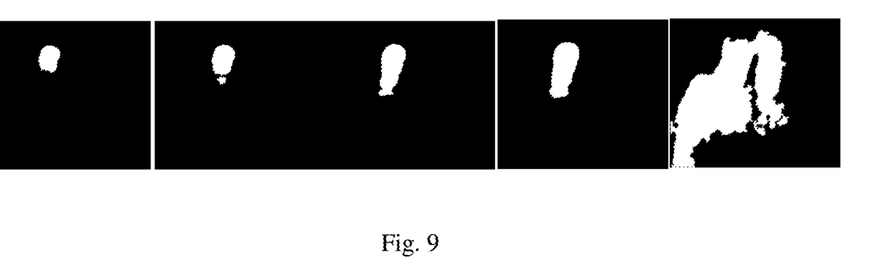
FIG. 9 shows a succession of images representing a change in a region.

FIG. 9 is a succession of images showing a change in a region. The images in FIG. 9 read from left to right. FIG. 9 corresponds typically to running through one of the branches of the hierarchical tree. Thus, only one region enlarges in the images in FIG. 9. The region obtained in the penultimate image in the succession is a final region since the region obtained in the last image in the succession does not meet the predetermined criterion.

Figure 10A:
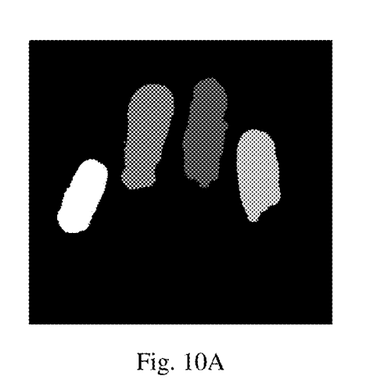
FIG. 10A shows a result of the region-formation method.

FIG. 10A shows regions formed following the running through of the hierarchical tree. Four regions corresponding to the four fingers placed on the top face of the transparent plate 100 have been obtained.

Figure 10B:
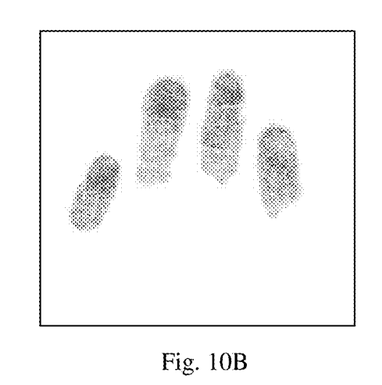
FIG. 10B shows zones of the image resulting from the top-hat filter corresponding to regions detected by the region-formation method.

FIG. 10B shows zones of the second image (i.e. the image resulting from the top-hat filter) corresponding to the four regions detected following the running through of the hierarchical tree. The regions shown in FIG. 10A can be used since they are disconnected, which makes it possible easily to distinguish the four fingers.

The result of running through the hierarchical tree is however not always as ideal.

Figure 11A:
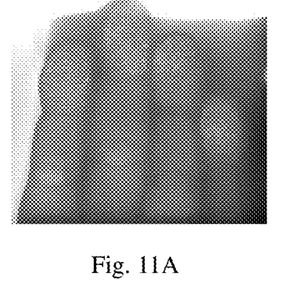
FIG. 11A shows an image of a plurality of fingers supplied by an image sensor of the thin film transistor type in which the fingers are stuck.
Figure 11B:
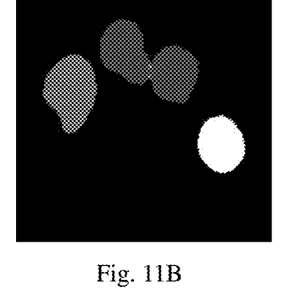
FIG. 11B shows regions detected in the image of a plurality of fingers in which the fingers are stuck.

FIG. 11A shows an image of a plurality of fingers supplied by the TFT sensor 101 in which the fingers are stuck and FIG. 11B shows final regions obtained from this image. It will be realised in FIG. 11B that, whereas four fingers appear in the image in FIG. 11A, only three regions appear in FIG. 11B.

Figure 12A:
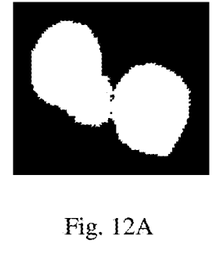
FIG. 12A shows a region detected in the image of a plurality of fingers in which the fingers are stuck and FIG. 12B shows a print corresponding to the region detector.
Figure 12B:
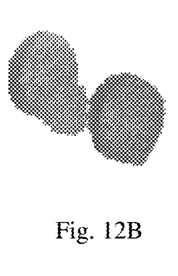

FIG. 12A shows one of the regions detected in the image in FIG. 11A and FIG. 12B shows a fingerprint corresponding to the region detected. As can be seen in FIG. 12B, the region in FIG. 12A corresponds to two fingerprints. Applying the predetermined criterion has therefore enabled the agglomeration of two regions that should not have been agglomerated.

To deal with this case, the method of FIG. 4 comprises a step 46 and a step 47 that are optional.

During step 46, the processing module 102 applies a morphological erosion to the regions obtained during step 45. The erosion is done by wide filter in order to parcel out the regions obtained during step 45 if applicable.

During step 47, the processing module 102 applies at least one morphological dilation to the regions obtained during step 46 as long as each region obtained by morphological erosion remains independent. In other words, during step 47 the processing module 102 applies at least one morphological dilation to the regions obtained during step 46, as long as the regions obtained during step 46 do not merge.

Figure 12C:
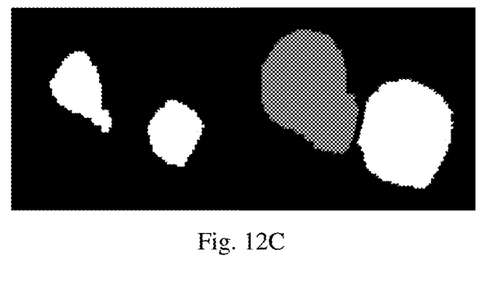
FIG. 12C shows on the left a region detected in the image of a plurality of fingers in which the fingers are stuck after morphological erosion; and, on the right, a result of a morphological dilation of the regions obtained by morphological erosion.

FIG. 12C shows on the left the region in FIG. 12A after morphological erosion and on the right a result of at least one morphological dilation of the regions obtained by morphological erosion. The region in FIG. 12A has been separated into two separate regions.

In a step 48, the processing module 102 determines a convex envelope for each region obtained during step 45 (or during step 47 if this step has been performed). To do this, the processing module 102 uses a method described in "A. M Andrew, *Another efficient algorithm for convex hulls in two dimensions, Information Processing Letters*, 1973".

In a step 49, the processing module 102 generates a fourth image while keeping the pixels of the second image (i.e. the image issuing from the top-hat filter) situated in each convex envelope.

In an optional step 50, the processing module 102 applies a processing operation to the values of the pixels of the fourth image included in each convex envelope so that these pixels have values situated in a predetermined range of values. The processing applied during step 50 consists, for each set of pixels situated in a convex envelope, of a histogram heightening in order to map a range of the pixel values of said set of pixels on a range of pixel values of fingerprints supplied by a CCD or CMOS sensor. In an image in grey levels in 8 bits supplied by a CCD or CMOS sensor, the values of the pixels are distributed between 0 and 255, the pixels corresponding to the ridges being the darkest and the pixels corresponding to the valleys being the lightest. In one embodiment, the processing applied during step 50 consists of extending the histogram of the values of the pixels of the fourth image included in each convex envelope so as to distribute it between 0 and 255. If for example the values of said pixels are included between a minimum value VMIN and a maximum value VMAX, each pixel having the value VMIN takes the value 0, each pixel having the value VMAX takes the value 255 and each pixel having a value VINT intermediate between VMIN and VMAX takes a value $$VINT = \frac{255(VINT - VMIN)}{VMAX - VMIN}.$$

In another embodiment, still for an image in grey levels in 8 bits, the pixels with a value of between 0 and 100 are set to 0 and the pixels with a value of between 150 and 255 are set to 255. The pixels with a value of between 100 and 150 are set to 0 if a majority of the pixels in the vicinity thereof have a value of between 0 and 100 and are set to 255 if the majority of the pixels in the vicinity thereof have a value of between 150 and 255. A vicinity of a pixel is for example a square of pixels with sides of three pixels centred on said pixel.

In an optional step 51, the processing module 102 applies a distance function to the pixels of the fourth image included in each convex envelope and obtained after the processing of step 50. Hereinafter, these pixels are referred to as internal pixels. It is considered here that the pixels of the convex envelope are internal pixels. The principle of the distance function is described in the document "A. Rosenfeld, J. Pfaltz, *Distance functions in digital pictures*, *Pattern Recognition*, Vol. 1, 1968, P. 33-61". Applying the distance function to the internal pixels makes it possible to determine, for each internal pixel, a distance between said internal pixel and the convex envelope that contains said internal pixel. The processing module 102 next sets all the pixels situated outside a convex envelope to a predetermined value $V_{pred}$. The predetermined value $V_{pred}$ is for example equal to 255 for a grey-level image. The value of each internal pixel is next modified according to the distance $d_{TFD}$ between this internal pixel and the convex envelope that contains it obtained by distance function. For example, $d_{TFD}$>DIST, the value of the internal pixel remains unchanged.

If $0 \leq d_{TFD} \leq DIST$, the value of the pixel $V_{pixel}$ is modified as follows:

$$V_{pixel} = \frac{V_{pred} \times (DIST - d_{TFD}) + d_{TFD} \times V_{pixel}}{DIST}$$

where DIST is a maximum distance equal for example to 10 pixels. The processing applied during step 51 makes it possible to obtain a gentle transition at the boundaries of the zones of the fourth image delimited by the convex envelopes. This gentle transition attenuates any negative impact that any projected shadows preserved at the edges of the fingers would have.

The invention claimed is:

1. A method for processing an image representing at least one finger supplied by an image sensor of the thin-film transistor type of a fingerprint capture system, said system comprising a transparent plate comprising a face on which each finger is placed and said image sensor is positioned so as to generate an image of each finger, wherein the method comprises:

obtaining an image of each finger supplied by the image sensor, referred to as the first image;

obtaining a second image by eliminating each continuous component of the first image;

obtaining a third image by applying an averaging filter to the second image;

applying a connected component analysis to the third image in order to define regions in said third image, each region comprising pixels having an identical value, referred to as the representative value;

organising the regions in the form of a hierarchical tree in which the regions are organised in accordance with a parent-child relationship, a first region being the parent of a second region, which is then the child of the first region, when at least one pixel of the second region is adjacent to a pixel of the first region and a difference between the values representing the first and second regions is smaller than a difference between the values representing the first region and all other regions having at least one pixel adjacent to a pixel of the first region, the child region having a representative value smaller than its parent region;

running through the hierarchical tree by order of increasing representative values and agglomerating each child region with its parent region when a predetermined criterion is met, a predetermined criterion to agglomerate a child region with a parent region being based on a comparison of an information representative of a change in areas of regions resulting from the agglomeration and/or on a comparison of a gradient value representing the parent region to be agglomerated with at least one child region with a predetermined gradient threshold;

determining a convex envelope for each agglomerated region obtained;

generating a fourth image while keeping the pixels situated in each convex envelope in the second image.

2. The method according to claim 1, wherein the method comprises applying a morphological erosion to the agglomerated regions obtained and applying at least one morphological dilation to the regions obtained by morphological erosion as long as each region obtained by morphological erosion remains independent, the determination of each convex envelope taking place on each agglomerated region after morphological erosion and dilation.

3. The method according to claim 1, wherein the method comprises applying a processing to the values of the pixels of the fourth image included in each convex envelope so that these pixels have values situated in a predetermined range of values.

4. The method according to claim 1, wherein, the predetermined criterion based on a comparison of an information representative of a change in the areas of regions resulting from the agglomeration consists of comparing a coefficient of increase with a first predetermined threshold, a child region being able to be agglomerated with its parent region when the coefficient of increase is less than said first predetermined threshold, the coefficient of increase being calculated as follows:

$$C = a \times S + b \times \Delta S$$

where C is the coefficient of increase, a and b are predetermined constants, S is an area of the child region and $\Delta S$ is a percentage increase of the area of the agglomerated region with respect to the area of the child region.

5. The method according to claim 1, wherein, in the predetermined criterion based on a comparison of a gradient value representing the parent region to be agglomerated with at least one child region with a predetermined gradient threshold, the gradient representing the parent region is calculated between the value representing the parent region and the lowest value representing a region of the third image, an agglomeration being accepted when said gradient is higher than the predetermined gradient threshold.

6. The method according to claim 1, wherein the method comprises fixing the value of each pixel of the fourth image situated outside a convex envelope at a predefined value and modifying an initial value of each pixel of the fourth image situated inside a convex envelope as a final value according to a distance between said pixel and said convex envelope, so that the final value approaches the predefined value when said distance decreases and approaches the initial value when said distance increases.

7. A non transitory storage medium having stored thereon a computer program, the computer program comprising instructions for performing the method according to claim 1 when the computer program is executed by a processor.

8. A device for processing an image representing at least one finger supplied by an image sensor of the thin film transistor type of a fingerprint capture system, said system comprising a transparent plate comprising a face on which each finger is placed and said image sensor is positioned so as to generate an image of each finger, wherein the device comprises at least one processor configured to:

obtain an image of each finger supplied by the image sensor, referred to as the first image;

obtain a second image by eliminating each continuous component of the first image;

obtain a third image by applying an averaging filter to the second image;

apply a connected component analysis to the third image in order to define regions in said third image, each region comprising pixels having an identical value, referred to as the representative value;

organise the regions in the form of a hierarchical tree in which the regions are organised in a parent-child relationship, a first region being the parent of a second region, which is then the child of the first region, when at least one pixel of the second region is adjacent to a pixel of the first region and a difference between the values representing the first and second regions is smaller than a difference between the values representing the first region and all other regions having at least one pixel adjacent to a pixel of the first region, the child region having a lower representative value than its parent region;

run through the hierarchical tree by order of increasing representative values and agglomerating each child region with its parent region when a predetermined criterion is met, a predetermined criterion to agglomerate a child region with a parent region being based on a comparison of an information representative of a change in areas of regions resulting from the agglomeration and/or on a comparison of a gradient value representing the parent region to be agglomerated with at least one child region with a predetermined gradient threshold;

determine a convex envelope for each agglomerated region obtained;

generate a fourth image while keeping the pixels situated in each convex envelope in the second image.

* * * * *